(12) United States Patent
Lehmann et al.

(10) Patent No.: US 8,009,058 B2
(45) Date of Patent: Aug. 30, 2011

(54) TRACKING LOCATION AND USAGE OF A MECHANICAL SUB ASSEMBLY (MSA) WITHIN AN AUTOMATED STORAGE LIBRARY UTILIZING A UNIQUE IDENTIFIER ASSOCIATED WITH LOCATION COORDINATES OF THE MSA

(75) Inventors: Stefan Lehmann, Tucson, AZ (US); Shawn M. Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 12/236,762

(22) Filed: Sep. 24, 2008

(65) Prior Publication Data
US 2010/0073184 A1 Mar. 25, 2010

(51) Int. Cl.
*G08B 21/00* (2006.01)
(52) U.S. Cl. ........ 340/679; 235/385; 235/486; 360/92.1
(58) Field of Classification Search .................. 340/679, 340/540; 235/383, 385, 486; 360/92.1
See application file for complete search history.

(56) References Cited

U.S. PATENT DOCUMENTS

| 5,303,034 | A | 4/1994 | Carmichael et al. |
| 5,814,171 | A | 9/1998 | Manes et al. |
| 6,213,705 | B1 | 4/2001 | Wilson |
| 6,438,448 | B1 * | 8/2002 | Manes et al. .................. 700/218 |
| 7,111,781 | B2 | 9/2006 | Fletcher |

* cited by examiner

*Primary Examiner* — Jeffery Hofsass
(74) *Attorney, Agent, or Firm* — Dillon & Yudell LLP

(57) ABSTRACT

A method, system, and computer program product for sensing the presence and/or misplacement of mechanical sub assemblies (MSAs) within storage slots of automated storage libraries. Each MSA is tracked based on signed empty cell barcode labels. Signed empty cell barcode labels are utilized to uniquely identify the frame, column, and row coordinates of one or more MSAs. The storage library automatically scans all signed empty cell barcode labels utilizing a scanner mounted on a robotic device. The system provides a counter for each MSA, allowing the storage library to track the usage of the MSA. As usage of the MSA reaches a predefined lifecycle, the library automatically generates an alert to replace the MSA. When a MSA is rearranged within the storage library, the library automatically maps the new frame, column, and row coordinates of the MSA. The counter dynamically modifies the usage count of the MSA according to the unique cell barcode label, thereby tracking all current and previous cartridges, and/or other items that may be scanned during MSA activity.

17 Claims, 5 Drawing Sheets

TRACKING LOCATION AND USAGE OF A MECHANICAL SUB ASSEMBLY (MSA) WITHIN AN AUTOMATED STORAGE LIBRARY UTILIZING A UNIQUE IDENTIFIER ASSOCIATED WITH LOCATION COORDINATES OF THE MSA

BACKGROUND

1. Technical Field

The present invention generally relates to computer systems and in particular to automated storage libraries for retrieving computer data.

2. Description of the Related Art

Automated storage library systems generally improve the access speed and reliability of data storage libraries containing large amounts of information. Automated storage library systems include a plurality of storage media devices, a transport mechanism, and one or more storage media drives in communication with a computer system or network for inputting and outputting desired information. Automated tape cartridge libraries generally have a plurality of storage bins, slots, or cells for storing tape cartridges, a robotic picker mechanism (often referred to as a "picker"), and one or more tape drives.

A typical method for determining if a storage slot is empty includes tracking the use of storage slots and/or devices within a storage library system. This method includes scanning cartridges and empty cells utilizing barcode labels for cartridges, and empty cell labels for storage cells. The deep cell storage library scans all empty cell barcode labels utilizing a scanner mounted on a robotic device. The method of auditing cartridges and empty cells utilizing barcode labels for cartridges and empty cell labels for storage cells does not allow tracking of rearranged/relocated cells. Wherein rearrange/relocated cells comprises cells that have been removed from an original location and reinstalled in a new and/or different position. During mechanical sub assembly replacement activity, there is a possibility that active components are reinstalled in a location other than the original location. When the mechanical sub assembly is not returned to the original locations the mechanical sub assembly may not be efficiently tracked.

SUMMARY OF ILLUSTRATIVE EMBODIMENTS

Disclosed are a method, system, and computer program product for sensing the presence and/or misplacement of mechanical sub assemblies (MSAs) within storage slots of automated storage libraries. Each MSA is tracked based on signed empty cell barcode labels. Signed empty cell barcode labels are utilized to uniquely identify the frame, column, and row coordinates of one or more MSAs. The storage library automatically scans all signed empty cell barcode labels utilizing a scanner mounted on a robotic device. The system provides a counter for each MSA, allowing the storage library to track the usage of the MSA. As usage of the MSA reaches a predefined lifecycle, the library automatically generates an alert to replace the MSA. When a MSA is rearranged within the storage library, the library automatically maps the new frame, column, and row coordinates of the MSA. The counter dynamically modifies the usage count of the MSA according to the unique cell barcode label, thereby tracking all current and previous usage of the MSA. The unique barcode label may be utilized to identify single deep cells, drives, cartridges, and/or other items that may be scanned during MSA activity.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
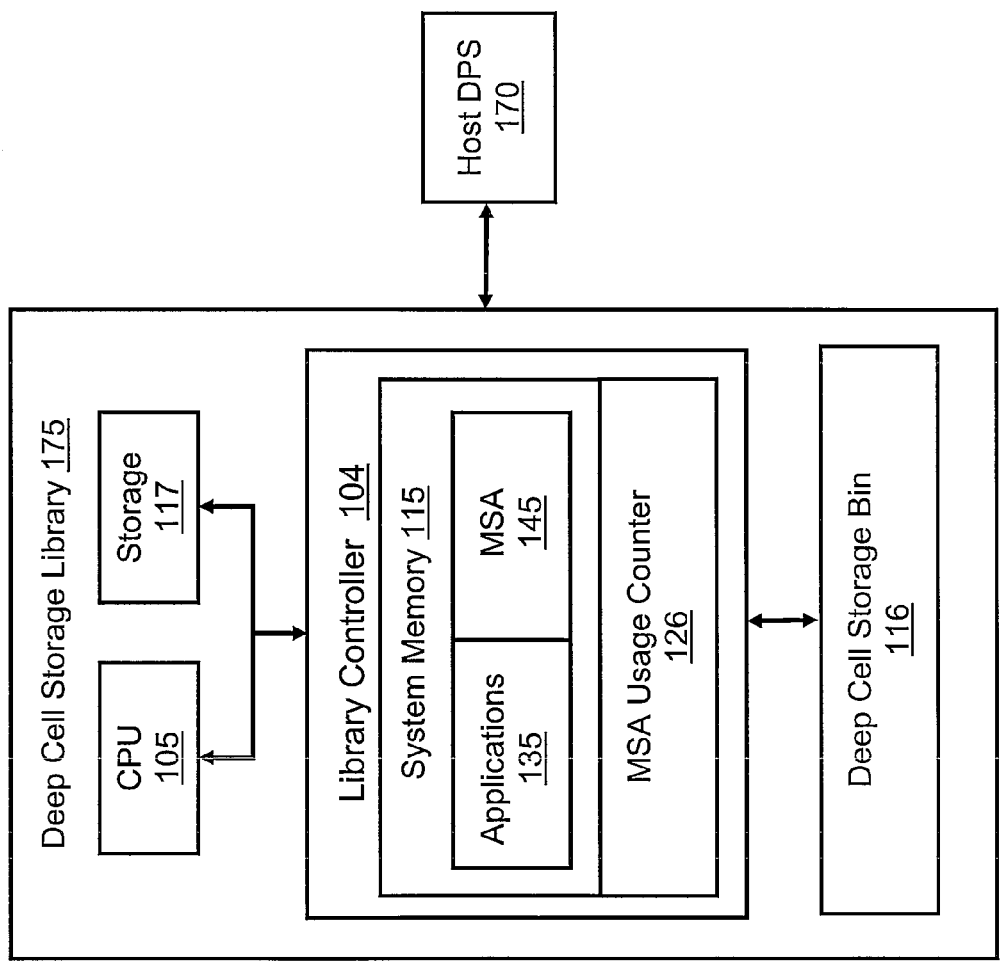
FIG. 1 illustrates a deep cell storage library in accordance with one embodiment of the invention.

Disclosed are a method, system, and computer program product for sensing the presence and/or misplacement of mechanical sub assemblies (MSAs) within storage slots of automated storage libraries. Each MSA is tracked based on signed empty cell barcode labels. Signed empty cell barcode labels are utilized to uniquely identify the frame, column, and row coordinates of one or more MSAs. The storage library automatically scans all signed empty cell barcode labels utilizing a scanner mounted on a robotic device. The system provides a counter for each MSA, allowing the storage library to track the usage of the MSA. As usage of the MSA reaches a predefined lifecycle, the library automatically generates an alert to replace the MSA. When a MSA is rearranged within the storage library, the library automatically maps the new frame, column, and row coordinates of the MSA. The counter dynamically modifies the usage count of the MSA according to the unique cell barcode label, thereby tracking all current and previous usage of the MSA. The unique barcode label may be utilized to identify single deep cells, drives, cartridges, and/or other items that may be scanned during an inventory.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term "signed empty cell barcode label" refers to a barcode label that uniquely identifies a mechanical sub assembly (MSA). Each reference to MSA refers to a "gate/spring mechanical sub assembly". Although MSAs are described in the following embodiments, any mechanical sub assembly may be utilized such as field replaceable units (FRUs). The term "deep cell storage slot" is utilized to describe storage slot technology. Although the term "deep cell storage slot" is utilized, the invention may be applied to any storage slot technology, including, but not limited to, single deep storage slots. The term "usage" as described herein references the insertion and/or retrieval of a tape cartridge into/out of the storage slot.

With reference now to the figures, FIG. 1 depicts a block diagram representation of a deep cell storage library connected to a host data processing system (DPS) system. Deep cell storage library 175 comprises at least one processor or central processing unit (CPU) 105 connected to system memory 115 via library controller 104. Storage 117, within which data/instructions/code may be stored is also connected to library controller 104. Deep cell storage bin 116, which communicates with library controller 104, may comprise one or more deep cell slots. Deep cell slots (illustrated in FIG. 2) may contain one or more MSAs. Deep cell storage library 175 may also connect to host data processing system 170.

Notably, in addition to the above described hardware components of deep cell storage library 175, various features of the invention are completed via software (or firmware) code or logic stored within system memory 115 or other storage (e.g., storage 117) and executed by CPU 105. Thus, illustrated within system memory 115 are software/firmware components, applications 135. System memory 115 also comprises MSA usage counter 126, mechanical sub assembly (MSA) utility 145, wherein MSA utility 145 provides software that controls various attributes of deep cell storage library 175. MSA utility 145 is illustrated and described as a stand alone or separate software/firmware component, which provides specific functions, as described below.

Deep cell storage library 175 executes MSA utility 145. Among the software code/instructions provided by MSA utility 145, and which are specific to the invention, are: (a) code for identifying empty deep cell slots via signed empty cell barcode labels; (b) code for counting MSA usage; and (c) code for identifying MSA locations. For simplicity of the description, the collective body of code that enables these various features is referred to herein as MSA utility 145. According to the illustrative embodiment, when CPU 105 executes MSA utility 145, deep cell storage library 175 initiates a series of functional processes that enable the above functional features as well as additional features/functionality, which are described below within the description of FIGS. 2-5.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The present invention is not limited to barcodes and barcode scanners. Methods such as radio frequency identification (RFID) signed empty cell tags and RFID readers may be utilized.

Figure 2:
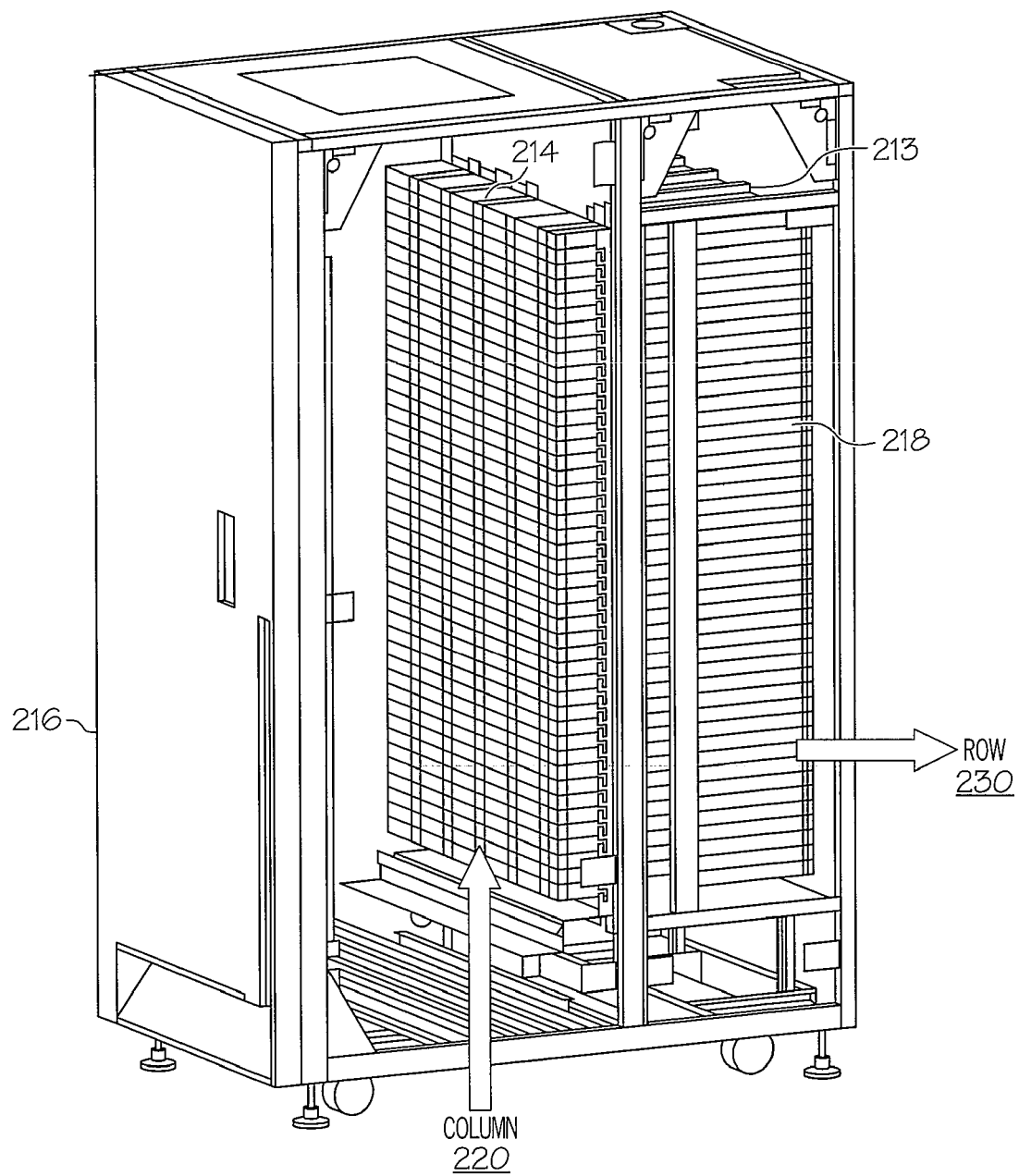
FIG. 2 illustrates an empty deep cell slot array according to one embodiment of the invention.

FIG. 2 depicts a representation of an automated deep cell storage library array. Deep cell storage library 275 is utilized for the storage and retrieval of one or more MSAs 214. Deep cell storage library 275 includes empty deep cell slot 213, and MSAs 214 stored within deep cell slot 218 of deep cell frame 216, at column 220 and row 230. A barcode scanner attached to a robotic arm (not shown) may be utilized to read the unique empty cell barcode label affixed to MSA 214. FIG. 2 illustrates one frame; however multiple frames may be added in series to form the automated storage library.

In one embodiment, the column, row, and frame coordinates of the MSA is recorded when the empty cell barcode label is scanned. Deep cell slot 218 represents the slot in which MSA 214 is located. During the scan, deep cell frame 216, column 220, and row 230 of MSA 214 are automatically identified, and the unique identity of MSA 214 is recorded. MSA utility 145 (FIG. 1) increments the usage counts of MSA 214. MSA usage counter 114 (FIG. 1) updates when MSA 214 is utilized, which is when a data cartridge (storage medium device) is inserted into the slot and/or removed from the slot.

Figure 3:
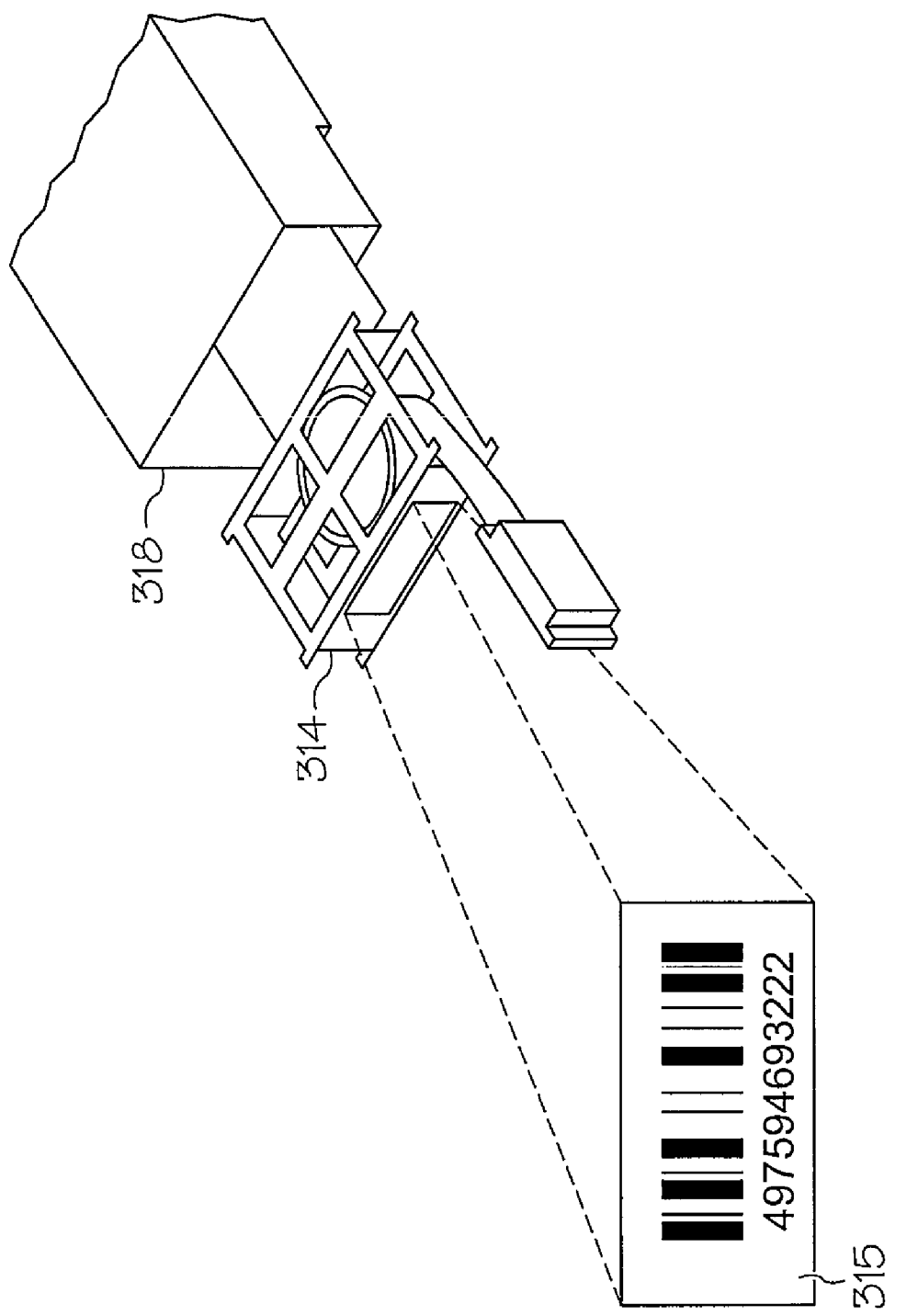
FIG. 3 illustrates a signed empty cell barcode label identifying a mechanical sub assembly (MSA) in accordance with one embodiment of the invention.

FIG. 3 depicts a signed empty bar code label attached to a MSA, which is connected to a deep cell slot. Signed empty cell barcode label 315 is affixed to MSA 314. MSA 314 is connected to deep cell slot 318. In one embodiment, an inventory scan is performed within a deep cell storage library. Signed empty cell barcode label 315 is utilized to identify MSA 314, as well as alert the library that there are no cartridges in the associated deep cell 318. Signed empty cell barcode label 315 is a unique identifier that is oriented on the surface of MSA 314. Signed empty cell barcode label 315 is oriented on a surface that is not accessible by a scanner when one or more data cartridges are positioned within deep cell slot 318.

In one embodiment, after inventory of one or more deep cell slot/MSA components, the frame, row, and column of MSA 314, within the array, is stored. Following each inventory scan, deep cell storage library 175 (FIG. 1) receives an electronic signal, equivalent to the unique identity on signed empty cell barcode label 315. The MSA utility also reports the column, row, and frame of MSA 314 coordinates to the deep cell storage library. Data received from each scanned signal may be stored within storage 117 (FIG. 1).

In one embodiment, MSA utility 145 updates MSA usage counter 114 when MSA 214 is utilized, which is when data cartridge (storage medium device) is inserted into the slot and/or removed from the slot. MSA utility 145 monitors the usage of MSA 314. As usage of MSA 314 increases, MSA usage counter 126 is incremented. When the predefined lifecycle of MSA 314 has been reached, MSA utility 145 outputs an alert that notifies the user and/or service personnel concerning the maintenance and/or replacements of MSA 314.

Figure 4:
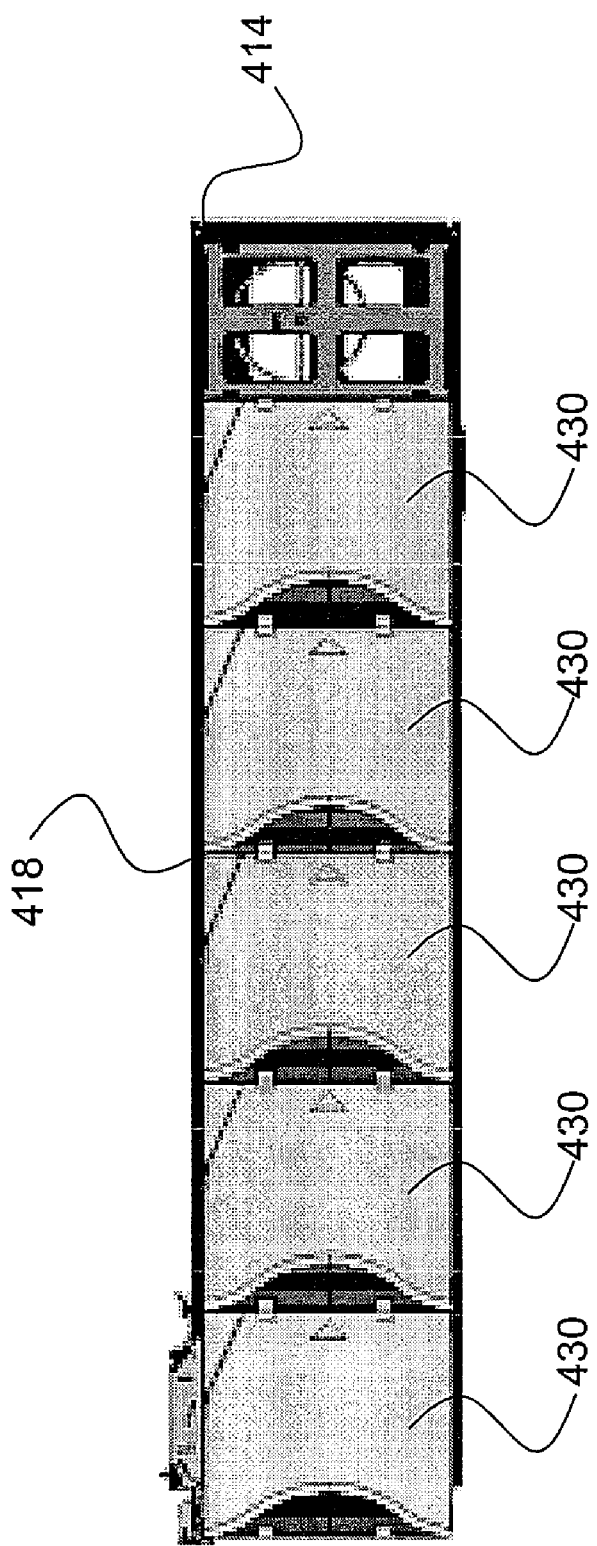
FIG. 4 illustrates a MSA connected to a deep cell storage slot, loaded with data cartridges according to one embodiment of the invention.

With reference now to FIG. 4 which depicts a MSA that is connected to a deep cell slot, including one or more data cartridges positioned within the deep cell slot. MSA 414 is connected to deep cell slot 418, and one or more data cartridges 430 are within deep cell slot 418.

In one embodiment, after being utilized, MSA 414 is relocated from a first deep cell slot position to a second deep cell slot position. During an inventory scan MSA 414 is recognized in the second location. When one or more data cartridge 430 enter the second deep cell storage slot position, MSA utility 145 increments the usage count of MSA 414 with respect to the first deep cell slot position; thereby tracking total usage of MSA 414 when located at any deep cell storage slot within the deep cell storage library.

In one embodiment, MSA 414 is associated with a unique identifier. MSA 414 is relocated from a first deep cell slot position to a second deep cell slot position. When the unique identifier of MSA 414 is scanned, in the first position, a first frame, a first column, and a first row coordinate of MSA 414 are identified and recorded. When MSA 414 is detected in a second position, one or more of a second frame, a second column, and a second row coordinate of MSA 414 are identified and recorded. MSA 414 may be associated with 'n' number of positions, where 'n' is a finite number.

Figure 5:
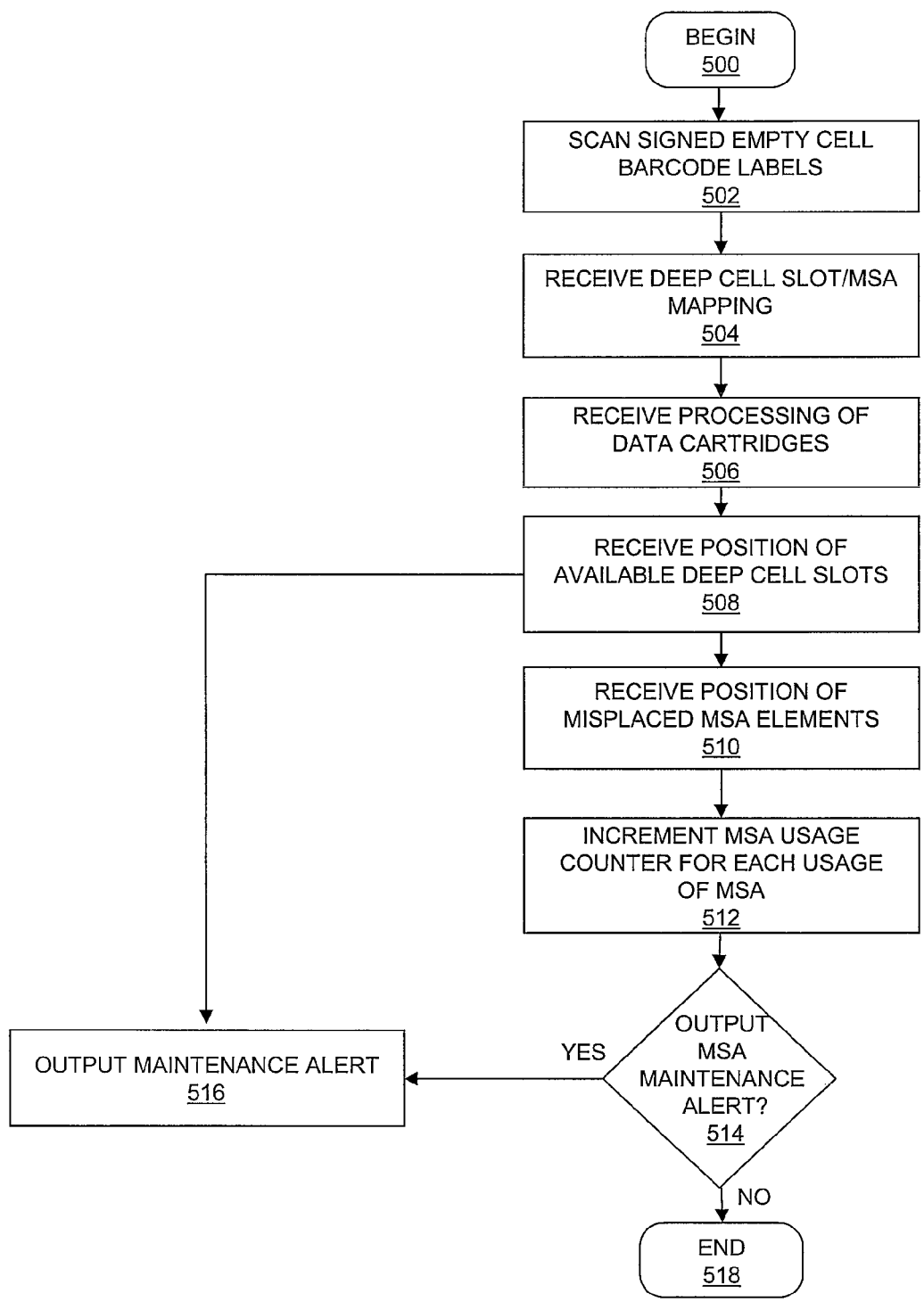
FIG. 5 is a logic flow chart illustrating the method for determining the presence and/or misplacement of a MSA during each inventory scan, according to one embodiment of the invention.

FIG. 5 is a flow chart illustrating various methods by which the above processes of the illustrative embodiments are completed. FIG. 5 depicts the method for determining the presence and/or misplacement of a MSA during each inventory scan. Although the method illustrated in FIG. 5 may be described with reference to components shown in FIGS. 1-4, it should be understood that this is merely for convenience and alternative components and/or configurations thereof can be employed when implementing the various methods. Key portions of the methods may be completed by MSA utility 145 executing within storage library 175 (FIG. 1) and controlling specific operations of storage library 175, and the methods are thus described from the perspective of MSA utility 145 and storage library 175.

The process of FIG. 5 begins at initiator block 500 and proceeds to block 502, at which signed empty cell barcodes are scanned to identify the position and/or location of empty deep cell slots and their installed MSA. The MSA utility receives mapping (frame, row, and column) of the deep cell slots and the associated MSA, at block 504. At block 506, results from the processed data cartridges are received. Processing data cartridges may comprise inserting the cartridges in the deep cell slot wherein the MSA element resides. The library tracks the MSA usage count via frame, column, and row information reported to the MSA utility.

At block 508 the positions of empty deep cell slots are received by the library controller. The position of any rearranged/relocated MSA elements are received at block 510. The MSA usage counter 126 (FIG. 1) is incremented at block 512 when any usage of the MSA is detected (including when a cartridge is placed in the MSA). When the MSA usage counter is updated, MSA utility 145 receives notification of the amount of usage for each MSA. A decision is made at block 514, whether the MSA usage passes a predefined threshold number of usage at which the MSA requires replacement and/or modification. When the MSA requires replacement and/or modification (i.e. the MSA usage exceeds the threshold), the MSA utility outputs a maintenance alert at block 516. If maintenance of the MSA element is not required, the process ends at block 518. After a maintenance alert has been output at block 516, the process ends at block 518.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:

assigning a unique identifier to a mechanical sub assembly (MSA), wherein the MSA is located within an automated storage library;

associating the unique identifier with the frame, column, and row coordinates of one or more mechanical sub assemblies (MSAs);

dynamically tracking a location of the MSA when one or more changes are detected affecting the MSA from among: rearrangement of the MSA, relocation of the MSA, and removal of the MSA; and automatically incrementing a usage counter associated with the automated storage library, in response to a data cartridge being inserted or removed from the MSA.

2. The method of claim 1, further comprising:

automatically scanning one or more unique identifiers associated with the MSA;

receiving one or more of the frame, column, and row coordinate of the MSA; and dynamically identifying an empty cell in response to the MSA being removed from a cell containing the MSA.

3. The method of claim 1, further comprising:

enabling the usage counter to track one or more MSAs;

comparing a value of the usage counter against a predefined threshold count, wherein the threshold count corresponds to a lifecycle of the MSA; and automatically sending an alert in response to usage of the MSA indicating one or more of: nearing completion of the lifecycle and completion of the lifecycle.

4. The method of claim 1, wherein dynamically tracking a location of the MSA when one or more changes are detected further comprises:

scanning the unique identifier of the MSA; and incrementing the usage counter in response to one or more unique identifiers being scanned.

5. The method of claim 4, further comprising:

in response to the unique identifier of a first MSA being scanned in a first position, storing a first frame, a first column, and a first row coordinate of the MSA;

in response to the first MSA being detected in a second position, identifying one or more of a second frame, a second column, and a second row coordinate of the MSA; and recording one or more of the first position and the second position of a MSA.

6. The method of claim 1, wherein associating the unique identifier with the frame, column, and row coordinates of one or more MSAs, further comprises:

assigning an electronic signal to the unique identifier, wherein the electronic signal identifies the frame, column, and row coordinates;

receiving the electronic signal;

identifying the frame, column, and row coordinates in response to the electronic signal being received; and storing the frame, column, and row coordinates of the one or more MSAs.

7. The method of claim 3, further comprising:

determining when the MSA is at least one of: nearing completion of the lifecycle and completing the lifecycle;

displaying the alert in response to the MSA having reached one or more of: near completion of the lifecycle and completion of the lifecycle; and enabling one of replacement and modification of the MSA in response to the MSA being one or more of: near completion of the lifecycle and completed with the lifecycle.

8. The method of claim 7, further comprising:

initializing the usage counter of the MSA in response to the MSA being replaced; and adjusting the usage counter of the MSA in response to the MSA being replaced or modified.

9. An electronic device comprising:

a processing component;

a scanning mechanism;

a usage counter;

an input mechanism that receives a scan of a unique identifier;

an output mechanism that outputs an electronic signal associated with the unique identifier;

a mechanism for receiving the electronic signal;

a utility for processing the electronic signal and which comprises code for:

assigning a unique identifier to a mechanical sub assembly (MSA), wherein the MSA is located within an automated storage library;

associating the unique identifier with the frame, column, and row coordinates of one or more mechanical sub assemblies (MSAs);

dynamically tracking a location of the MSA in response to detecting one or more changes affecting the MSA from among: rearrangement of the MSA, relocation of the MSA, and removal of the MSA; and automatically incrementing a usage counter associated with the automated storage library, in response to a data cartridge being inserted or removed from the MSA.

10. The electronic device of claim 9, further comprising:

a scanning mechanism that automatically scans one or more unique identifiers associated with the MSA; and wherein the utility further comprises code for:

receiving one or more of the frame, column, and row coordinate of the MSA; and dynamically identifying an empty cell in response to the MSA being removed from a cell containing the MSA.

11. The electronic device of claim 9, wherein the utility further comprises code for:

enabling the usage counter to track one or more MSAs;

comparing a value of the usage counter against a predefined threshold count, wherein the predefined threshold count corresponds to a lifecycle of the MSA; and automatically sending an alert in response to usage of the MSA being one or more of: near completion of the lifecycle and completed with the lifecycle.

12. The electronic device of claim 9, wherein dynamically tracking a location of the MSA when one or more changes are detected further comprises:

scanning the unique identifier of the MSA; and incrementing the usage counter in response to one or more unique identifiers being scanned.

13. The electronic device of claim 12, the utility further comprising code for:

in response to the unique identifier of a first MSA being scanned in a first position, storing a first frame, a first column, and a first row coordinate of the MSA;

in response to the first MSA being detected in a second position, identifying one or more of a second frame, a second column, and a second row coordinate of the MSA; and recording one or more of the first position and the second position of a MSA.

14. The electronic device of claim 9, wherein associating the unique identifier with the frame, column, and row coordinates of one or more MSAs, further comprises:

assigning an electronic signal to the unique identifier, wherein the electronic signal identifies the frame, column, and row coordinates;

receiving the electronic signal;

identifying the frame, column, and row coordinates in response to receipt of the electronic signal; and storing the frame, column, and row coordinates of the one or more MSAs.

15. The electronic device of claim 11, the utility further comprising code for:

determining when the MSA one or more of: nears completion of the lifecycle and completes the lifecycle;

displaying the alert in response to the MSA being one or more of: near completion of the lifecycle and completed with the lifecycle; and enabling one of replacement or modification of the MSA in response to the MSA being one or more of: near completion of the lifecycle and completed with the lifecycle.

16. The RFID or other electronic device of claim 15, the utility further comprising code for:

initializing the usage counter of the MSA in response to the MSA being replaced; and adjusting the usage counter of the MSA in response to the MSA being one of replaced or modified.

17. The electronic device of claim 9, wherein the device is a radio frequency identification (RFID) device.

* * * * *